United States Patent

Kubota et al.

[11] 4,010,310
[45] Mar. 1, 1977

[54] MAGNETIC POWDER

[75] Inventors: Yuichi Kubota; Shinji Umeki; Yasumichi Tokuoka, all of Tokyo, Japan

[73] Assignee: TDK Electronics Company, Limited, Tokyo, Japan

[22] Filed: July 21, 1975

[21] Appl. No.: 597,636

Related U.S. Application Data

[63] Continuation of Ser. No. 446,750, Feb. 28, 1974, abandoned.

[30] Foreign Application Priority Data

Mar. 20, 1973 Japan ............................ 48-31486

[52] U.S. Cl. ............................ 427/403; 427/127; 428/900
[51] Int. Cl.² ............................ H01F 1/36
[58] Field of Search ............................ 427/127–132, 427/47, 48; 428/403, 900

[56] References Cited

UNITED STATES PATENTS

| | | | |
|---|---|---|---|
| 3,573,980 | 4/1971 | Haller et al. | 427/48 UX |
| 3,718,594 | 2/1973 | Miller | 427/127 UX |
| 3,770,500 | 11/1973 | Imaoka et al. | 427/128 UX |
| 3,795,542 | 3/1974 | Halaby et al. | 427/130 UX |

*Primary Examiner*—Bernard D. Pianalto
*Attorney, Agent, or Firm*—Oblon, Fisher, Spivak, McClelland & Maier

[57] ABSTRACT

An improved magnetic powder characterized by high coercive force and high magnetic flux density which is formed by admixing a cobalt compound with a magnetic iron oxide, and adding to said admixture a complex forming agent which complexes with the cobalt compound to promote adsorption of cobalt onto the surface of the magnetic iron oxide.

5 Claims, 6 Drawing Figures

MAGNETIC POWDER

This is a continuation of application Ser. No. 446,750 filed Feb. 28, 1974, now abandoned.

BACKGROUND OF THE INVENTION

1. Field of the Invention

This invention relates to a magnetic iron oxide and a process for preparing a magnetic powder which is useful for a magnetic recording medium.

2. Description of the Prior Art

In the field of magnetic recording technology, conventional magnetic powder such as $\gamma\text{-}Fe_2O_3$ have been found to possess unsatisfactory magnetic characteristics in view of recent improvements in magnetic recording systems. Because of these improvements, magnetic powder are needed which have a higher coercive force and a higher magnetic flux than obtainable with conventional magnetic compositions. One improved magnetic powder is an iron-nickel-cobalt alloy powder which was developed about ten years ago. However, it could not be practically used because of difficulties encountered in the preparation of the alloy. Another magnetic powder which has been developed is a cobalt modified $\gamma\text{-}Fe_2O_3$. It has been prepared by dispersing acicular iron oxide in a solution of cobalt chloride having a pH of 7.5 – 9.0, and then heating the dispersion at 80°– 100° C to form a mixture of cobalt hydroxide and acicular iron oxide. Thereafter, the solid material obtained was crushed and heated at 370°– 425° C to yield a cobalt modified $\gamma\text{-}Fe_2O_3$. However, in order to obtain magnetic powder characterized by high coercive force, relatively large quantities of the cobalt component had to be used. When a relatively large amount of the cobalt component is used, however, the thermal demagnetization and pressure demagnetization of the powder is increased and the degree of coagulation of the powder is increased so that the dispersibility in the preparation of magnetic paints is decreased.

The saturated magnetic flux density value of the cobalt containing composition decreases relative to increasing quantities of cobalt in the composition. Accordingly, magnetic recording media prepared with the magnetic powder have the following disadvantages with regard to their use in magnetic tapes:

1. The decrease in the residual magnetic flux density (Br) of magnetic tapes with increasing temperatures is high. Moreover, the demagnetization resulting from the increased temperatures and the subsequent cooling to room temperatures is also high. Heretofore, magnetic tapes have been susceptible to demagnetization caused by the heat generated by the friction between the magnetic tape and the magnetic head in the running of the tape. The demagnetization of the tapes, especially videotapes, which have a memory tape that passes at a relatively high rate of speed between the magnetic tape and the magnetic head, in the reproduction of magnetic recording signals is a particular difficulty which must be solved.

2. The decrease of the coercive force Hc of the magnetic tapes caused by an increse in temperature is high. The tendency increases when the coercive force Hc of the magnetic tape is high.

A need, therefore, continues to exist for the provision of a powdered magnetic composition which has a high coercive force and a high magnetic flux density, which has a high resistance to thermal demagnetization.

SUMMARY OF THE INVENTION

Accordingly, one object of this invention is to provide a magnetic powder which is characterized by excellent magnetic properties such as a high coercive force and a high magnetic flux density so that it is suitable for high density magnetic recording media such as videotapes, audiotapes (especially cassette tapes having superior high frequency characteristics), master media for contact magnetic prints, magnetic cards and magnetic drums.

Briefly, this object and other objects of the invention as hereinafter will become more readily apparent can be attained by providing an improved magnetic powder which comprises the addition of a complex forming agent to an acicular iron oxide which complex forming agent promotes the adsorption of a cobalt compound on the surface of the magnetic iron oxide.

BRIEF DESCRIPTION OF THE DRAWINGS

A more complete appreciation of the invention and many of the attendant advantages thereof will be readily obtained as the same becomes better understood by reference to the following detailed description when consideredin connection with the accompanying drawings, wherein.

Figure 1:
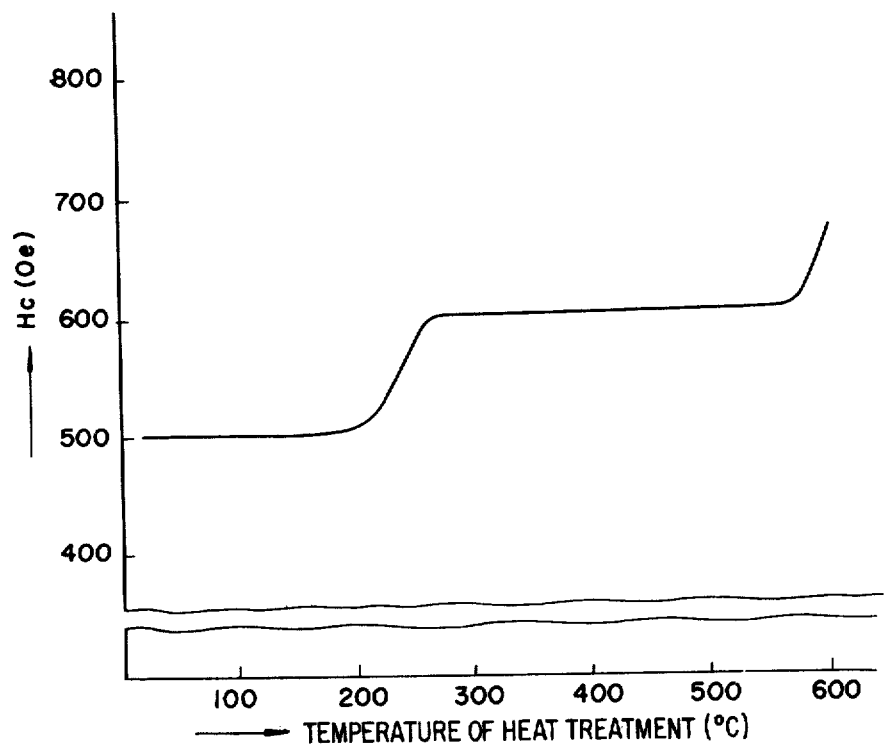
FIG. 1 is a graph which shows the relationship of the coercive force Hc to the temperature of the heat treatment.

DETAILED DESCRIPTION OF THE PREFERRED EMBODIMENTS:

The improved magnetic powder of this invention is prepared as follows: An acicular iron oxide is dispersed in a solution containing a cobalt compound and a complex forming agent which is capable of forming a cobalt complex. An alkali such as NaOH, KOH, an organic amine, ammonia or the like is added to the dispersion to adjust the pH into the alkaline region at room temperature. Preferably, the pH of the dispersion is greater than 10. The alkaline dispersion is heated with stirring at a temperature between room temperature and the boiling point of the dispersion. It is not critical that the temperature be maintained at the boiling point. This temperature is maintained for a time sufficient so that the cobalt compound is uniformly adsorbed onto the surface of the acicular, crystalline, magnetic iron oxide. The dispersion is then filtered and dried by conventional methods whereby a powder is obtained. The powder is dried at about 20° – 60° C and is heated at 200° –500° C in an inert gas such as nitrogen to obtain the magnetic powder of the invention.

In the formulation of the magnetic powder of this invention, suitable cobalt compounds which can be used include cobalt complexes; cobalt complex salts such as $CoCl_2 \cdot 6H_2O$, $CoSO_4 \cdot 6H_2O$ and $Co(NO_3)_2 \cdot 4H_2O$; organic salts of cobalt; cobalt hydroxide; cobalt oxide. Most preferable is cobalt hydroxide.

In the dispersion, a cobalt complex is formed by the reaction of cobalt ion and the complex forming agent. Suitable complex forming agents include oxy acids which contain a hydroxyl group and a carboxyl group such as sodium citrate, tartaric acid, Rochelle Salt, sodium tartrate, citric acid and the like; ethylenediamine; EDTA (ethylenediaminetetraacetic acid) acetylacetone; pyridine; dipyridyl; hydrazine and derivatives thereof. Other suitable complex forming agents include those which contain groups which form complex ions or complex salts with cobalt such as $-C=O$, $-NH_2$, $-NH$, $-NOH$, $-COOH$, $-SH$, $-NO_2$, $-OH$, $NH_3$, and the like. The amount of complex forming agent used should range from 1–10 mole % per mole of the cobalt component. At least a portion of the cobalt complex decmposes to form cobalt hydroxide, and cobalt oxide is adsorbed onto the surface of the acicular magnetic iron oxide as a core material. The presence of the complex forming agent smoothly and uniformly promotes the adsorption of the cobalt compound. When no complex forming agent is present, such uniform adsorption cannot be accomplished. The acicular iron oxide used in the composition has an $Fe^{2+}/Fe^{3+}$ ratio of 0.1 – 0.35.

Having generally described this invention, a further understanding can be obtained by reference to certain specific examples which are provided herein for purposes of illustration only and are not intended to be limiting unless otherwise specified.

EXAMPLE 1

Into a 200 liter stainless steel tank were charged 80 liters of deionized water, 90 g of $CoCl_2 \cdot 6H_2O$ and 150 g of Rochelle salt (sodium potassium tartarate). The $CoCl_2$ and Rochelle salt dissolved to form a cobalt-tartaric acid complex. To the solution was added 2,000 g of acicular magnetic iron oxide having an average particle length of 0.8 $\mu$ with a ratio of the long axis to the short axis of 6 : 1 and a ratio of $Fe^{2+}$ to $Fe^{3+}$ of 0.32. The resulting dispersion was uniformly mixed by a dispersing mixer. An aqueous sodium hydroxide solution prepared by dissolving 150 g of NaOH in 20 liters of deionized water was added to the dispersion. The resulting dispersion had a Ph of 13.2 The stirred mixture was heated at 100° C for 1 hour. After the reaction, the mixture had a pH of about 13. The dispersion then was filtered and washed with deionized water until a filtrate was obtained which had a pH of about 8. The powder obtained was dried at 60° C for 48 hours, and had the following magnetic characteristics.

| Coercive force Hc: | 500 Oe |
| --- | --- |
| Saturated magnetic flux density Bm: | 990 G/cm³ |
| Residual magnetic flux density Br: | 520 G/cm³ |

The magnetic powder was heated at 50° – 600° C in $N_2$ at the flow rate of 300 liter/hour for 1 hour. The magnetic characteristics of the product are shown in Table 1.

Table I

| Sample | Temperature at heating (° C) | Hc (Oe) | Bm (G/cm³) | Br (G/cm³) |
| --- | --- | --- | --- | --- |
| 1–1 | no heating | 500 | 990 | 520 |
| 1–2 | 50 | 500 | 984 | 495 |
| 1–3 | 100 | 500 | 957 | 502 |
| 1–4 | 200 | 510 | 988 | 513 |
| 1–5 | 300 | 600 | 985 | 521 |
| 1–6 | 400 | 600 | 970 | 511 |
| 1–7 | 500 | 600 | 994 | 514 |
| 1–8 | 600 | 670 | 920 | 460 |

FIG. 1 shows the relationship of the coercive force Hc of Table I versus temperature. As is clear from FIG. 1, increased coercive forces are not achieved by the heat treatment until temperatures in excess of 200° C are attained. Significant coercive forces Hc are achieved at temperatures greater than 200° C. At temperatures higher than 600° C, the coercive force Hc increases further. However, the saturated magnetic flux density Bm decreases because of the partial formation of hematite type iron oxide. Thus, heat treatments in excess of 600° C are not preferred. The optimum heat treatment temperature is about 200° – 500° C.

EXAMPLE 2

Into a 200 liter stanless steel tank was charged 80 liters of deionized water, 90 g of $CoCl_2 \cdot 6H_2O$ and 150 g of sodium citrate. The $CoCl_2$ and sodium citrate disslved to form a cobalt-citric acid complex. To the solution was added 2000 g of acicular magnetic iron oxide having an average particle length of 0.8$\mu$ with a ratio of the long axis to the short axis of 6 : 1 and a ratio of $Fe^{2+}$ to $Fe^{3+}$ of 0.28. The resulting dispersion was uniformly mixed by a dispersing mixer. An aqeuous sodium hydroxide solution prepared by dissolving 150 g of NaOH in 20 liters of deionized water was added to the dispersion. The resulting mixture had a pH of 13.2. The stirred mixture was heated at 100° C for 1 hour. After the reaction, the mixture had pH of 13.2. The dispersion was then filtered and washed with deionized water until a filtrate having a pH of about 8 was obtained. The powdered substance obtained was dried at 60° C for 48 hours, and then heated at 350° C in $N_2$ at a flow rate of 300 liter/hour for 1 hour.

The magnetic characteristics of the product were as follows.

| Coercive force Hc: | 600 Oe |
| --- | --- |
| Saturated magnetic flux density Bm: | 970 G/cm³ |
| Residual magnetic flux density Br: | 510 G/cm³ |

Reference 1

The Reference 1 shows the general procedure to make the cobalt modified $\gamma$-$Fe_2O_3$. Into a 200 liter stainless steel tank were charged 130 liters of deionized water and 1.6 kg of $CoCl_2 \cdot 6H_2O$ until the $CoCl_2$ dissolved. To the solution was added 12.6 kg of acicular $\gamma$-$Fe_2O_3$ having an average particle length of 0.8$\mu$ with a ratio of the long axis to the short axis of 6 : 1. The resulting dispersion was uniformly mixed by a dispersing mixer. 1.63 kg of 29 weight percents aqueous ammonia was added to the dispersion. The resulting mixture had a pH of 9.0. This mixture stirred for 1 hour.

The dispersion was then filtered. Filtered substance was ground to the magnetic powder. It was heated at 400° C in $N_2$ gas at a flow rate of 300 liter/hour for 1 hour. Cobalt content is 3.02 weight percent, and the magnetic characteristics of the product were as follows.

| | |
|---|---|
| Coercive force: | 530 Oe |
| Saturated magnetic flux density: | 874 G/cm³ |
| Residual magnetic flux density: | 714 G/cm³ |

Therefore it was clear in this reference case that much $CoCl_2 \cdot 6H_2O$ was necessary to attain the same level coercive force as in the case of Example 1 or 2.

Reference 2

This reference procedure shows the effect of not having a complex forming agent present. The procedure of Example 2 was followed except that sodium citrate (complex forming agent) was omitted. Into a 200 liter stainless steel tank were charged 80 liters of deionized water and 90 g of $CoCl_2 \cdot 6H_2O$ until the $CoCl_2$ dissolved. To the solution was added 2000 g of acicular magnetic iron oxide having an average particle length of 0.8μ with a ratio of the long axis to the short axis of 6 : 1 and a ratio of $Fe^{2+}$ to $Fe^{3+}$ of 0.32. The resulting dispersion was uniformly mixed by a dispersing mixer. An aqueous sodium hydroxide solution prepared by dissolving 150 g of NaOH in 20 liters of deionized water was added to the dispersion. The resulting mixture had a pH of 13.4 The stirred mixture was heated at 100° C for 1 hour. After the reaction, the mixture had a pH of 13.2. The dispersion was then filtered and washed with deionized water until a filtrate having a pH of about 8 was obtained. The powder was dried at 60° C for 48 hours, and had the following magnetic characteristics.

| | |
|---|---|
| Coercive force: | 490 Oe |
| Saturated magnetic flux density Bm: | 970 G/cm³ |
| Residual magnetic flux density Br: | 500 G/cm³ |

The magnetic powder was heated at 350° C in $N_2$ gas at a flow rate of 300 liter/hour for 1 hour. The magnetic characteristics of the product were as follows.

| | |
|---|---|
| Coercive force: | 540 Oe |
| Saturated magnetic flux density Bm: | 950 G/cm³ |
| Residual magnetic flux density Br: | 510 G/cm³ |

It is clear that the coercive forces of the samples of References 1 and 2 are lower than that of the sample of Example 2 using sodium citrate to form the complex.

EXAMPLE 3

Into a 200 liter stainless steel tank were charged 80 liters of deionized water, 800 g of $CoCl_2 \cdot 6H_2O$ and 1,200 g of Rochelle salt. The $CoCl_2$ and Rochelle salt dissolved to form a cobalt tartaric acid complex. To the solution was added 5,000 g of various acicular magnetic iron oxide particles having an average length of 0.8μ and a ratio of the long axis to the short axis of 6 : 1 and a ratio of $Fe^{2+}$ to $Fe^{3+}$ of 0.–0.5. The resulting dispersion was uniformly mixed in a dispersing mixer. An aqueous solution of 600 g NaOH in 10 liters of deionized water was added to the dispersion. The resulting mixture had a pH of 13.2. The mixture was then heated at 100° C with stirring for 1 hour. After the reaction, the mixture had a pH of 13.2 at room temperature. The dispersion was then filtered and washed with deionized water until a filtrate having a pH of about 8 was obtained. The powder obtained was dried at 60° C for 48 hours, and the magnetic characteristics of the product prepared by heating magnetic powder at 350° C in $N_2$ gas for 1 hour are shown in Table II.

TABLE II

| Sample | $Fe^{2+}/Fe^{3+}$ | Magnetic Characteristics Before Heat Treatment | | | Magnetic Characteristics After Heat Treatment | | |
|---|---|---|---|---|---|---|---|
| | | Hc (Oe) | Bm/ρ (G/cm³) | Br/ρ (G/cm³) | Hc (Oe) | Bm/ρ (G/cm³) | Br/ρ (G/cm³) |
| 1 | 0 | 360 | 896 | 429 | 510 | 890 | 620 |
| 2 | 0.01 | 356 | 906 | 431 | 645 | 872 | 641 |
| 3 | 0.075 | 356 | 938 | 435 | 815 | 911 | 574 |
| 4 | 0.12 | 410 | 957 | 451 | 880 | 955 | 441 |
| 5 | 0.22 | 413 | 962 | 437 | 1050 | 960 | 480 |
| 6 | 0.24 | 470 | 974 | 503 | 1000 | 985 | 511 |
| 7 | 0.28 | 500 | 990 | 520 | 960 | 1002 | 530 |
| 8 | 0.30 | 503 | 987 | 534 | 970 | 991 | 552 |
| 9 | 0.32 | 490 | 1008 | 520 | 940 | 1010 | 570 |
| 10 | 0.34 | 460 | 1010 | 530 | 740 | 1020 | 600 |

Figure 2:
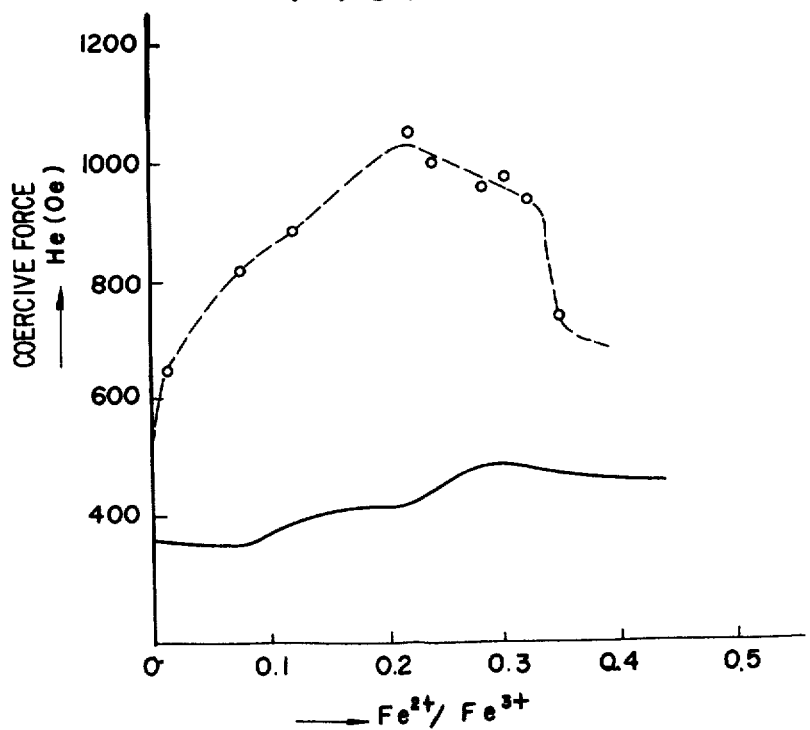
FIG. 2 is a graph which shows the relationship of the coercive force Hc to the ratio of $Fe^{2+}/Fe^{3+}$.

Before the heat treatment, the maximum coercive force Hc of the samples was no greater than about 500 Oe. However, after the heat treatment, the coercive force Hc of Samples 5 and 6 was greater than 1000 Oe. The saturated and residual magnetic flux densities were not substantially affected by the heat treatment. FIG. 2 shows the relationship of the coercive force Hc versus the $Fe^{2+}/Fe^{3+}$ ratio shown in Table II wherein the full line shows Hc before the heat treatment and the dotted line shows Hc after the heat treatment. As is clear from FIG. 2, the range of $Fe^{2+}/Fe^{3+}$ contributing to the increase in the coercive force Hc is in the range of about 0.12–0.34. The coercive force Hc decreases substantially at values outside of this range. It is believed that the iron oxide in the indicated range is a solid solutin of $\gamma$-$Fe_2O_3$ and $Fe_3O_4$. Such the iron oxide is prepared by the dehydration and reduction of goethite crystallized from an alkaline solution. Accordingly, the iron oxide is chemically stable and is not easily oxidized compared to $Fe_3O_4$ which is prepared by the dehydration and reduction of goethite crystallized from an acidic solution. However, the iron oxide is hard to store in a form such that the $Fe^{2+}/Fe^{3+}$ ratio of 0.5 – 0.35 remains relatively stable for a long time or in a form whereby the coercive force Hc is increased while preventing oxidation. If the $Fe^{2+}/Fe^{3+}$ ratio is less than 0.1, the iron oxide is mostly $\gamma$-$Fe_2O_3$ rather than $Fe_3O_4$. In order to maintain the iron oxide mixture in the ratio indicated, special control of the preparative conditions is required. Practically, it is difficult to use iron oxide in an $Fe^{2+}/Fe^{3+}$ ratio less than 0.1 as the iron oxide core of the invention. On the other hand, $Fe_3O_4$ prepared by the dehydration and reduction of goethite crystallized from an alkaline solution has a $Fe^{2+}/Fe^{3+}$ of 0.35 – 0.1 and has high stability to oxidation. For example, iron oxide having a $Fe^{2+}/Fe^{3+}$ ratio of 0.3 is changed to a $Fe^{2+}/Fe^{3+}$ ratio of 0.27 only after the passage of 3 years by keeping it in air at room temperature. From the viewpoint of chemical stability to air oxidation, it is also preferably for the $Fe^{2+}/Fe^{3+}$ ratio to range from 0.1 – 0.35. The magnetic powder prepared by the process of Examples 1 and 2 and the Reference 1, were used to prepared paint compositions as shown below and each paint was coated on a polyester base to form a magnetic tape.

| | |
|---|---|
| Magnetic powder | 120 parts by weight |
| Vinylchloride-vinylacetate copolymer | 30 parts by weight |
| Polyurethane resin | 10 parts by weight |
| Carbon black | 10 parts by weight |
| Surfactant | 1.5 parts by weight |
| Methylethyl ketone | 150 parts by weight |
| Methylisobutyl ketone | 150 parts by weight |
| Lubricant | 3 parts by weight |

Each composition was dispersed by a ball mill for 48 hours, and then was coated on the polyethyleneterephthalate base to prepare a magnetic tape. The magnetic characteristics of the tapes are shown in Table III.

TABLE III

| Sample | Magnetic Powder | Hc (Oe) | Br (G) | Bm (G) | Br/Bm | Thickness of membrane ($\mu$) |
|---|---|---|---|---|---|---|
| 1 | Example 1 | 500 | 1119 | 1583 | 0.756 | 6.5 |
| 2 | Example 2 | 550 | 1185 | 1530 | 0.769 | 8.1 |
| 3 | Reference 1 | 530 | 1043 | 1511 | 0.69 | 7.5 |

As shown in Table III, the magnetic tapes using the powdered magnetic substances of Examples 1 and 2 have superior effects than those of the Reference. The residual magnetic flux density Br and the coercive force Hc at −20° C∼ +60° C, of the magnetic tapes shown in FIGS. 3 and 4 respectively.

Figure 3:
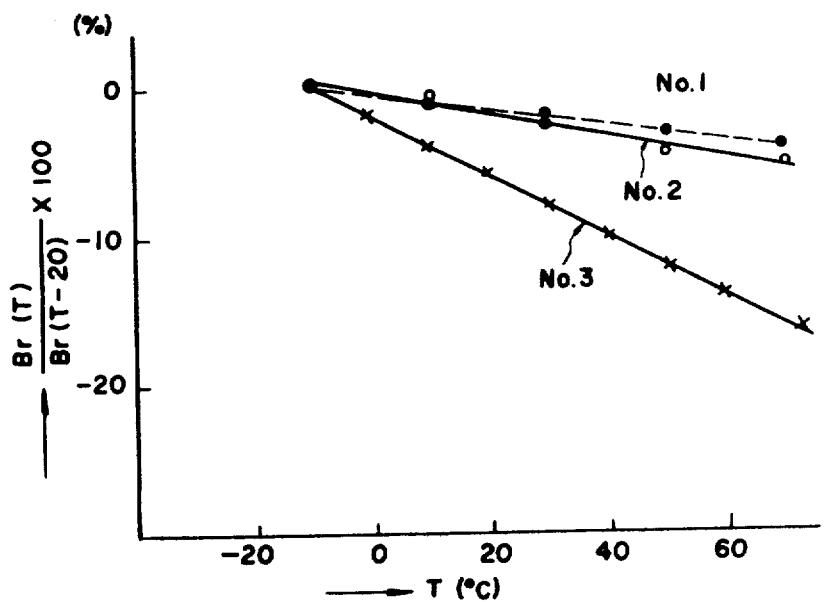
FIG. 3 is a graph which shows the temperature dependency of the residual magnetic flux density (Br) of magnetic tapes.

FIG. 3 shows a graph of the relationship of Br versus temperatures.

Figure 4:
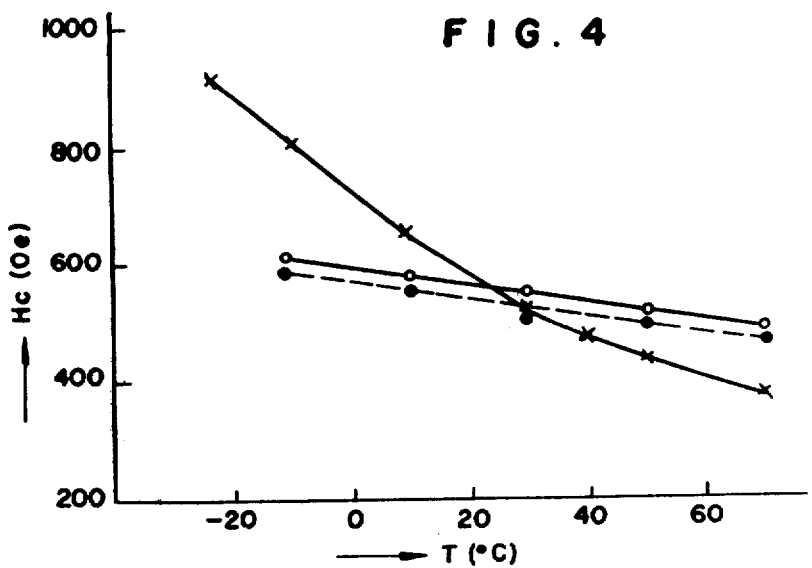
FIG. 4 is a graph which shows the temperature dependency of the coercive force Hc of magnetic tapes.

FIG. 4 shows a graph of the relationship of Hc versus temperature.

The temperature dependencies of Br and Hc shown in FIGS. 3 and 4 were measured by a vibrating sample type magnetometer (manufactured by Toei Kogyo VSM III) under an applied magnetic field of 5000 Oe.

In FIGS. 3 and 4, the magnetic characteristics of tapes made of the magnetic powder of Examples 1 and 2 and the Reference 1 are designated as Nos. 1, 2 and 3 respectively. The dependency of Br and Hc as a function of temperature of Sample Nos. 1 and 2 is appreciably less than that of Sample No. 3. The temperature dependencies of Sample Nos. 1 and 2 are excellent.

Figure 5:
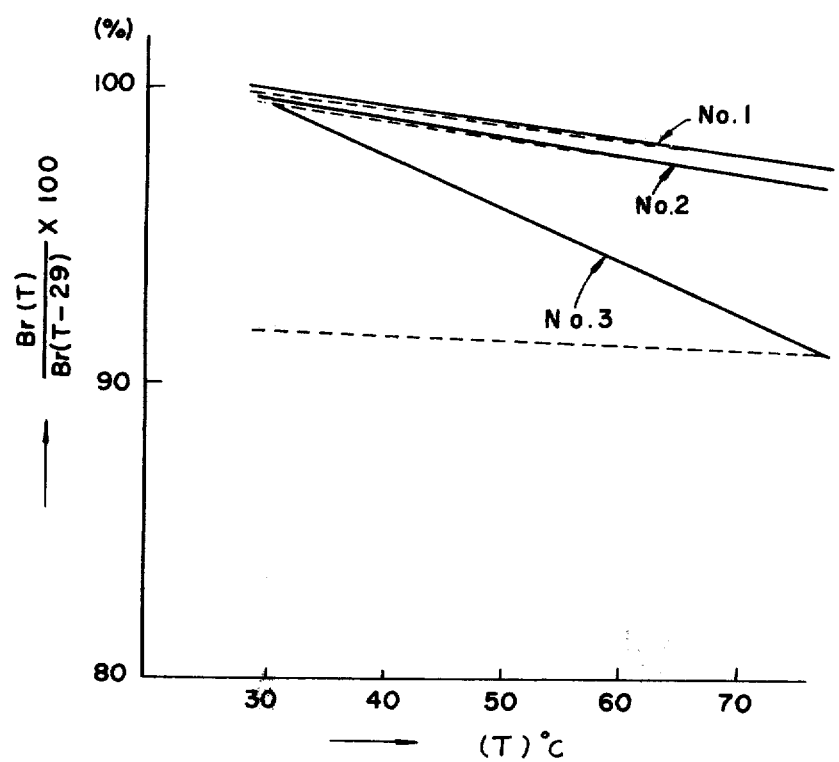
FIG. 5 is a graph which shows the thermal demagnetization characteristics of the residual magnetic flux density (Br) of the magnetic tapes.

FIG. 5 shows the thermal demagnetization characteristics of Br in the magnetic tape of Table 3. The full time of FIG. 5 shows a graph of the rate of residual magnetic flux density resulted by applying magnetic field of 2500 Oe to a sample magnetic tape at 29° C and heating the sample under applying the magnetic field at about 70° C to the residual magnetic flux density at 29° C. The dotted line of FIG. 5 shows a graph of the rate of residual magnetic flux density resulted by cooling the magnetic tape sample heated at higher than 70° C under demagnetization to the residual magnetic flux density at 29° C. Toei Kogyo VISM-III tester was used, in the measurement. On the Samples No. 1 and No. 2 prepared by using the magnetic powder of the invention, the rate of decrease of Br under rising the temperature was low in comparison with the tape No. 3 using conventional Co containing ion oxide of Reference 1. On the samples No. 1 and No. 2, the rate of decrease of the residual magnetic flux density from high temperature to room temperature, is reversible. However, that of the Sample No. 3 is irreversible, and about 8% of demagnetization is caused to the level of the residual magnetic flux density at the first magnetization. The fact shows that the demagnetization in a videotape can be decreased by using the magnetic powder of the invention.

The magnetic tapes using the magnetic powder of the invention have excellent characteristics which are shown by the examples. The magnetic powder of the invention can be used not only for magnetic tapes but also for other magnetic recording media because of the excellent magnetic characteristics exhibited by the compositions which are shown by the examples.

Figure 6:
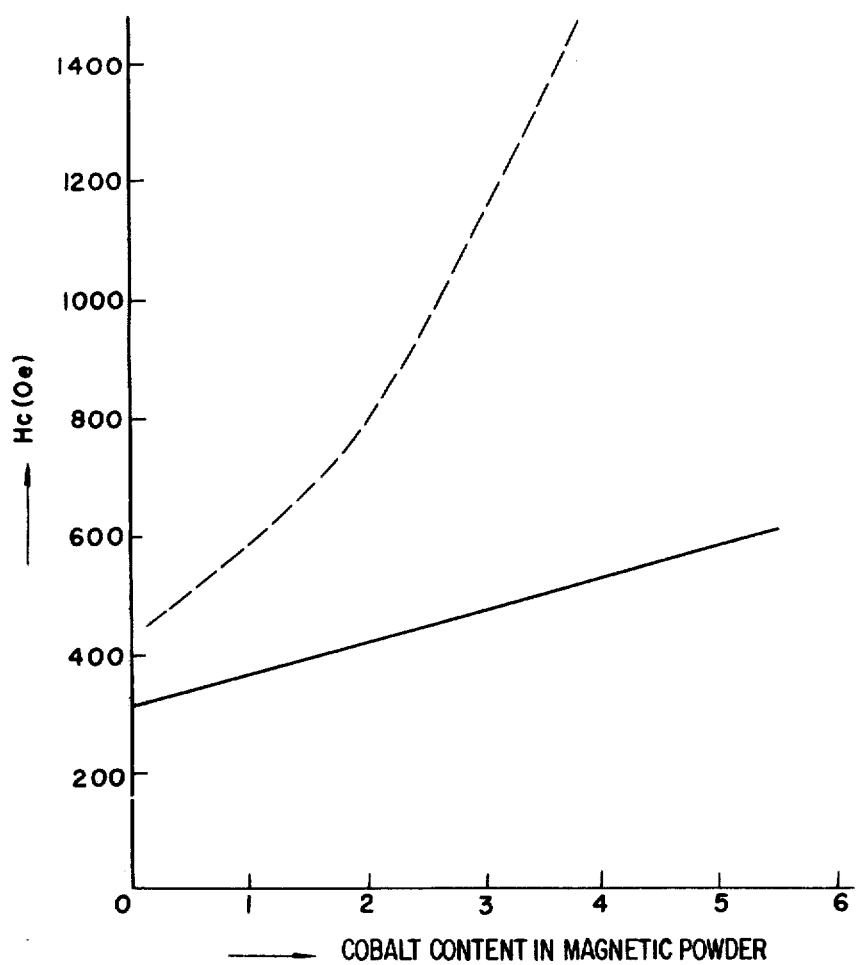
FIG. 6 is a graph which shows the relationship of the coercive force (Hc) versus the amount of cobalt component.

FIG. 6 shows the relationship of the coercive force Hc of a tape to the amount of cobalt component in the magnetic powder, wherein the dotted line represents a magnetic tape coated with the magnetic powder of the invention and the full line is for a tape coated with cobalt modified $\gamma$-$Fe_2O_3$ which is prepared by the general procedure. As it is clear from FIG. 6, the powdered magnetic substance of the invention shows a higher coercive force at lower cobalt contents. The conventional magnetic powder for high density recording magnetic tape has coercive force of 500 Oe level. In accordance with this invention the magnetic powder used for magnetic tape having coercive force of 500 Oe level can be given by only 1 wt. % of cobalt component in the magnetic powder. Even magnetic powder used for a magnetic tape having the coercive force of 1000 Oe level which is used for a magnetic tape used for contact magnetic printing a video tape, can be given by only about 2.5 wt. % of cobalt component in the magnetic powder. In comparison with the process of Reference 1, the cobalt content can be about 1/5. In accordance with the invention, the magnetic powder used for a magnetic tape having the high coercive force of 1500 Oe level (which is maximum limit of magnetic recording by a magnetic head), can be given by only about 4.5 wt. % of cobalt component in the magnetic powder. As stated earlier, compositions containing greater amounts of cobalt have important disadvantages from the viewpoint of thermal demagnetization and pressure demagnetization. Moreover, the high cobalt containing compositions are difficult to use in the preparation of magnetic paints because the particles coagulate. The disadvantages caused by the increased amounts of cobalt can be overcome by decreasing the cobalt content of the magnetic powder in accordance with the procedure of the invention.

Having now fully described the invention, it will be apparent to one of ordinary skill in the art that many changes and modifications can be made thereto without departing from the spirit or scope of the invention as set forth herein.

What is claimed is:

1. A magnetic powder prepared by a process, which consists essentially of:

mixing a cobalt compound selected from the group consisting of $CoCl_2 \cdot 6H_2O$, $CoSO_4 \cdot 6H_2O$, $Co(NO_3)_2 \cdot 4H_2O$, $Co(OH)_2$ and $CoO$ and 1–10 mole percent of a complexing agent selected from the group consisting of oxy acids containing a hydroxyl group and a carboxyl group or a salt thereof, ethylenediamine, ethylenediaminetetraacetic acid, acetylacetone, pyridine, dipyridyl, hydrazine, ammonia and derivatives thereof per mole of said cobalt compound, which form a cobalt complex, with acicular iron oxide characterized by a $Fe^{+2}/Fe^{+2}$ ratio of 0.1–0.35; and isolating and heating said acicular iron oxide at a temperature from 200°–500° C under an inert gas such that acicular iron oxide is obtained having cobalt oxide adsorbed thereon.

2. The magnetic powder of claim 1, wherein said oxy acid is citric acid, tartaric acid or a salt thereof.

3. The magnetic powder of claim 1, wherein said cobalt compound is cobalt hydroxide.

4. The magnetic powder of claim 1, wherein said cobalt compound and said complex forming agent are mixed in an alkaline solution of a pH greater than 10.

5. The magnetic powder of claim 1, wherein the amount of cobalt component adsorbed on the acicular iron oxide ranges from 1 wt% to 4.5 wt%.

* * * * *